United States Patent [19]

Taylor

[11] 4,229,132
[45] Oct. 21, 1980

[54] CARGO TIEDOWN ANCHOR MEANS

[75] Inventor: Chester J. Taylor, Warren, Mich.

[73] Assignee: The United States of America as represented by the Secretary of the Army, Washington, D.C.

[21] Appl. No.: 961,436

[22] Filed: Nov. 16, 1978

[51] Int. Cl.³ ............................................. B61D 45/00
[52] U.S. Cl. ..................................................... 410/115
[58] Field of Search .................... 280/179 R; 105/475, 105/478, 479, 481; 248/119 R, 129, 503; 410/106, 108, 110, 113, 115, 116

[56] References Cited

U.S. PATENT DOCUMENTS

| 1,973,624 | 9/1934 | Hanlon | 248/119 R |
| 2,755,747 | 7/1956 | Oakley | 105/478 X |
| 2,770,198 | 11/1956 | Blomberg | 105/479 |
| 2,870,722 | 1/1959 | Oakley | 105/478 X |
| 3,377,039 | 4/1968 | Hayes | 248/119 R |
| 4,070,834 | 1/1978 | Jameson | 105/475 X |

Primary Examiner—John J. Love
Assistant Examiner—Michael Mar
Attorney, Agent, or Firm—Peter A. Taucher; Nathan Edelberg; John E. McRae

[57] ABSTRACT

Improved cargo tiedown anchor means adapted for removable mounting in a vehicle cargo box to anchor the ends of flexible cargo-retention straps while the vehicle is in motion or in transit. The anchor means comprises a first anchor system near the box front wall and a second anchor system near the box tailgate. Each anchor system includes a rail extending the width of the cargo box and a series of curved rods welded to the rail at spaced points therealong. The rods form eyes to receive hook-like end connectors carried by the flexible cargo tiedown mechanisms.

5 Claims, 5 Drawing Figures

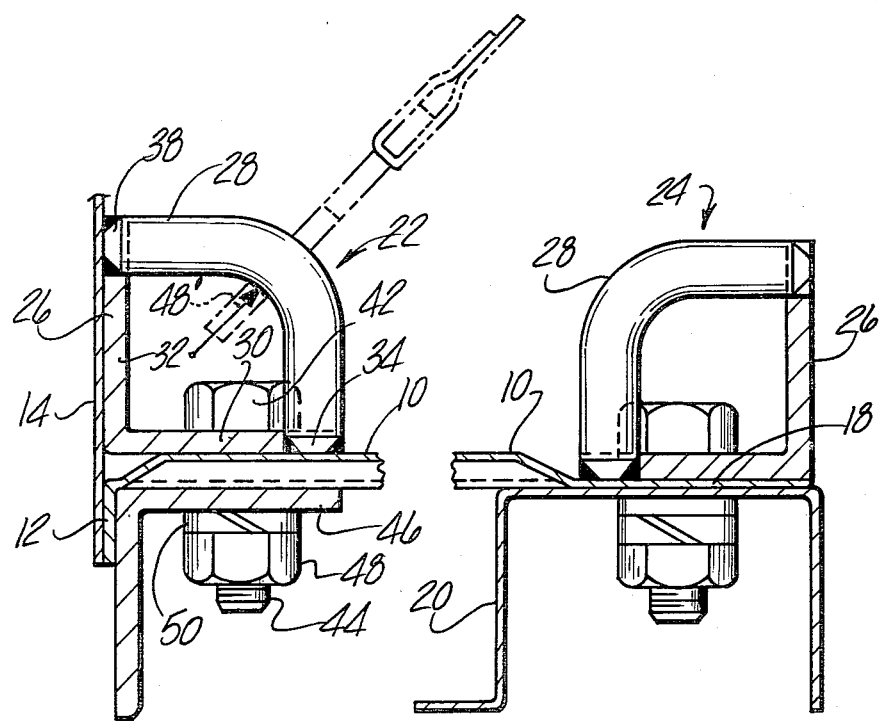
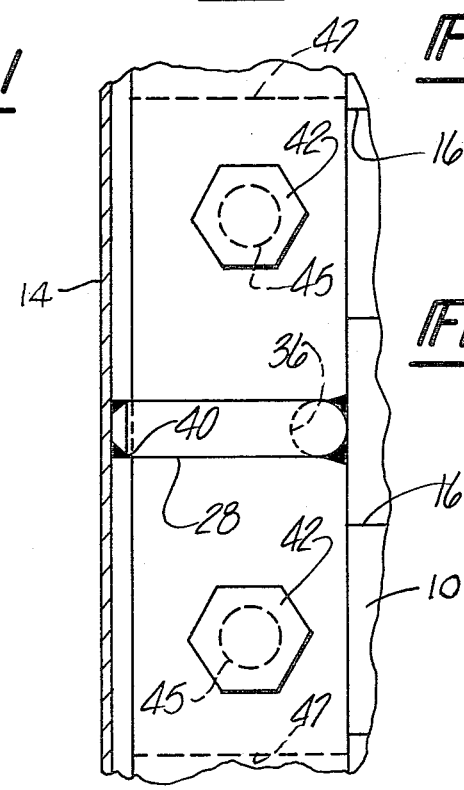

CARGO TIEDOWN ANCHOR MEANS

The invention described herein may be manufactured, used, and licensed by or for the Government for governmental purposes without payment to me of any royalty therein.

BACKGROUND AND SUMMARY OF THE INVENTION

There is shown in U.S. Pat. No. 1,973,624 a cargo tiedown anchor means consisting of a bar or pin 12 secured within a cup-shaped housing 10, said housing being adapted for recessed mounting in the floor of a vehicle. U.S. Pat. No. 3,377,039 shows a cargo tiedown anchor means comprising an eye 15 mounted within a housing 13 that is installed behind the wall 11 of a cargo space. In each of these patented arrangements the wall or floor of the cargo area is required to be modified in order to accommodate the tiedown anchor means. The present invention relates to a cargo tiedown anchor means that can be installed in a conventional truck cargo box without modification of the box, except for the drilling of bolt holes. Devices of the present invention are characterized by such advantageous features as low cost (through use of standard rod and angle iron construction), high strength, easy and convenient mounting in a range of different make and model trucks, a relatively large eye area for accommodating each hook connector, and capability for anchoring large numbers of tiedown straps (where necessary).

THE DRAWINGS

FIG. 1 is a fragmentary sectional view taken through the front lower portion of a vehicle cargo box having one embodiment of this invention installed thereon.

FIG. 2 is a sectional view taken through the rear lower portion of the FIG. 1 cargo box, and showing an anchor means of the present invention cooperable with the FIG. 1 structure.

FIG. 3 is a fragmentary top plan view of the structure shown in FIG. 1.

Figure 4:
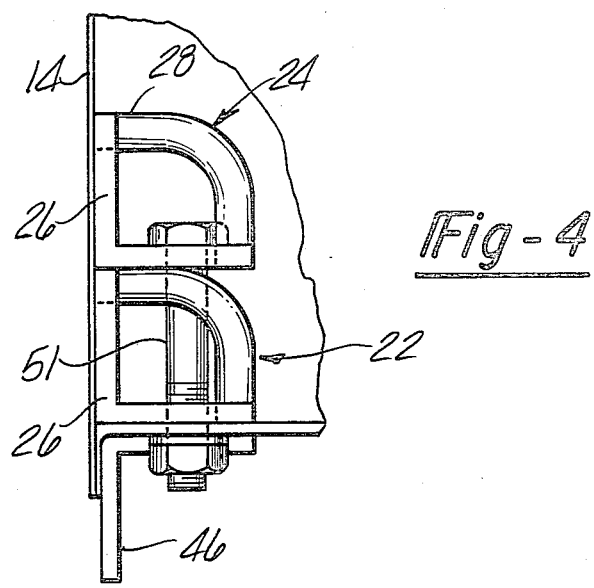
FIG. 4 is a reduced scale end elevational view of the FIG. 1 anchor means and the FIG. 2 anchor means stowed together in a storage or non-use position.

Referring in greater detail to FIG. 1, there is fragmentarily shown a conventional truck cargo box comprised of a corrugated sheet metal floor 10 having a downwardly extending flange 12 at its front edge, said flange being welded to the sheet metal box front wall 14 in conventional fashion. The corrugations in floor 10 run from the front of the box toward the rear of the box, as can be visualized from parallel lines 16 in FIG. 3. At its extreme rear edge the floor is flattened, as at 18 in FIG. 2; this flattened area of the floor is welded to a channel 20 that runs the full width of the cargo box. A tailgate, not shown, is hingedly connected to the box-reinforcement channel 20 for movement between a horizontal prone position in alignment with floor 10 and a vertical upright position closing the rear side of the box. In a typical vehicle the cargo box would be approximately six feet wide and nine feet long.

In some instances it is desired that cargo carried within the box be strapped down tightly to the floor in order to prevent such shifting of the cargo as might damage the cargo or the vehicle. For example, when a military truck loaded with cargo is driven cross-country or off the highway it is necessary that the cargo be tied down. Similarly when a loaded truck is being transported in a transport airplane the cargo should be strapped down. The present invention, provides a first anchor system 22 at front of a truck cargo box and a second anchor system 24 at the rear of the cargo box. Each anchor system comprises an angle iron or rail 26 bolted to the floor of the cargo box and a series of curved rods 28 welded to the rail at spaced points therealong. Each rail 26 preferably has a length slightly less than the width of the box, whereby each rail can be mounted in a transverse direction to locate the individual curved rods at spaced points across the width of the box. Any suitable number of curved rods 28 can be used, for example six or seven curved rods spaced about ten inches apart in a typical installation. The two rails 26 are installed so that the curved rods on one rail align longitudinally with the curved rods on the other rail. Conventional cargo tiedown straps, similar to those shown in U.S. Patent No. 3,050,799 can be positioned over cargo located on floor 10, with hook-like end connectors on the straps hooked around aligned ones of the curved rods 28 (as shown in dotted lines in FIG. 1 and 2). The hooked end connectors may be similar to those shown in U.S. Pat. No. 3,050,799 at 15 and 18.

Rail 26 shown in FIG. 1 comprises a first horizontal flange 30 abutting the upper surface of floor 10 and a second upstanding flange 32 in near adjacency to the box front wall 14. Each associated curved rod 28 has one of its chambered ends 34 extending into a semi-circular notch 36 in the edge of flange 30; the joint between the notch and chamfered end 34 is filled with weld material to provide a strong rod-rail connection. Similarly, chamfered end 38 of the curved rod extends into a semi-circular notch 40 in the edge of flange 32; weld material extends around the periphery of the rod at the defined joint to form a second strong connection between the curved rod and rail. After the various curved rods 28 have been welded to rail 26 the weld material is ground off flush with the face of the associated flange on the rail, thereby permitting the rail to be mounted on floor 10 against the box front wall 14.

Figure 5:
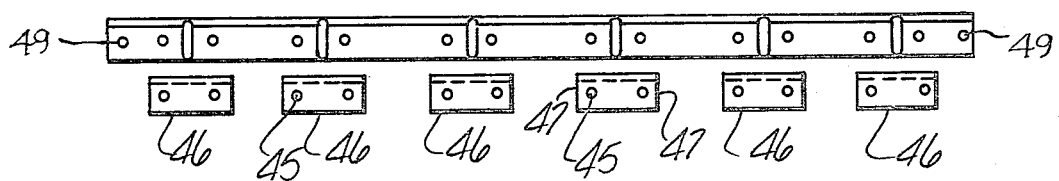
FIG. 5 is a reduced scale plan view of the FIG. 1 anchor means.

The rail is mounted on the cargo box floor by means of a series of bolts and nuts, each bolt having a hex head 42 and a threaded stem 44; each stem extends through aligned holes in flange 30, floor 10 and a flanged backup plate 46. The assembly is held in place by the nuts 48 and lock washers 50. The number of backup plates 46 corresponds to the number of curved rods 28. For example, as shown in exploded view FIG. 5, the rail is equipped with six curved rods 28 and six backup plates 46. As best seen in FIG. 3, each backup plate 46 is centered beneath one of the curved rods 28 so that its lateral edges 47 are spaced approximately the same distance from the plane of the curved rod (as seen in FIG. 3). Each backup plate 46 acts as a clamping anvil to draw the rod-mount area of rail 26 tightly against floor 10. Two bolts 42 extend through aligned holes 45 in the rail and backup plate to provide the clamp force. Since holes 45 are located equidistant from the associated rod 28 the clamp force is an equalized hold-down force that provides substantial resistance toward undesired pull-out of each curved rod 28. It will be understood that the plate-bolt arrangement shown in FIG. 3 is duplicated for each of the rods 28.

Each rail 26 is dimensioned in the cross sectional direction (FIG. 1) so that the circumscribed space defined by each curved rod 28 is sufficient to readily accommodate or receive a conventional hook connector, as shown in dashed lines in FIG. 1. In a representative structure the rail is dimensioned so that each of its flanges is approximately two inches wide. The curved rod 28 is formed of round cross section rod or bar stock of approximately ½ inch diameter. The internal radius of curvature of the defined eye (dimension 48' in FIG. 1) is about ¾ inch. The curved configuration of rod 28 is such that the tiedown strap (shown in dashed lines) can take any elevational angle consistent with the dimensions of the cargo being strapped down to the floor.

The anchor means 24 shown in FIG. 2 is identical with the anchor means shown in FIG. 1 except that no backup plates are utilized (due to the already present structural reinforcement provided by the transverse channel 20).

It will be seen from FIG. 2 that the rear anchor means 24 projects upwardly above the surface of floor 10. Under some circumstances the rear anchor means could pose an obstruction to personnel traffic into or out of the cargo box; i.e. the worker would be apt to trip over the anchor means. Therefore, the rear anchor means 24 is made to be removable from its installed position and repositionable in a stowed non-use position atop the front anchor means, as best shown in FIG. 4. For stowage purposes each anchor means is provided with two small holes near the ends of its rails 26; these holes are shown at 49 in FIG. 5. When the rails are in the stowed position of FIG. 4 two long bolts 51 can be extended through these holes to retain the rear anchor means in place. Since holes 49 are in addition to the previously mentioned holes 45 it is not necessary to disconnect any of the hold-down bolts for the front rail when it is desired to lock the other rail in the FIG. 4 stowed position.

The anchor system shown in the drawings is considered to have several advantages over conventional systems known to applicant. For example, the system is constructed from standard readily available angle iron and bar stock; the system can thus be manufactured for low volume requirements (e.g. selected military requirements) without extensive tooling expense or long lead times. Additionally the system is usable with no modification of the truck cargo box except for the drilling of the bolt holes in the cargo box floor; the system is adapted to usage with a range of different make, model and size trucks. The absence of a requirement for truck modification means that the system can be readily installed on trucks after initial manufacture (i.e. trucks already in service). The trucks can be retrofitted in the field without return to a factory or assembly point. Installation of the anchor systems can be accomplished rather quickly, using rails 26 as drilling templates for drilling the necessary holes in floor 10.

The right angular cross section of each rail 26 is considered to be advantageous in providing a relatively large eye area (at each curved rod 28) for the associated hook. Where conventional cargo straps are not available the large eye area can readily accommodate ropes as substitute cargo hold-down mechanisms.

Each rail 26 forms a mount mechanism for several curved rods 28, thus simplifying the assembly while reinforcing the truck floor against localized high stresses. Some cargo boxes have relatively thin gage walls that can oil can or deform when subjected to concentrated stress; each rail 26 (and back-up plates 46) absorbs the high forces and thus reinforces the cargo box wall (floor). It is also noted that each curved rod 28 has weld connections with the rail at both ends of the rod. Thus, each rod has twice the weld area of a conventional eye welded only at one end. The increased weld area provides a safety factor against displacement of the rod from the rail.

I wish it to be understood that I do not desire to be limited to the exact details of construction shown and described for obvious modifications will occur to a person skilled in the art.

I claim:

1. In association with a motor vehicle having a cargo box that includes a box front wall, a floor, and a rear tailgate: the improvement comprising a first cargo tiedown anchor means bolted to the floor at the front wall, and a second cargo tiedown anchor means bolted to the floor adjacent to the tailgate; said first anchor means comprising a first rail extending along the box front wall for substantially the full width of the box, said first rail having a first horizontal flange abutting the floor upper surface and a second upstanding flange in near adjacency to the box front wall, and a series of curved rods located at spaced points along the rail, each curved rod having one of its ends welded to the horizontal flange and its other end welded to the upstanding flange; each rod being connected to the respective rail flange at the tip area of the flange whereby the space circumscribed by the rod is sufficient to readily receive the hook connector of a flexible cargo tiedown mechanism; said second cargo tiedown anchor means comprising a second rail extending along the floor for substantially the full width of the cargo box, and a second series of curved rods located at spaced points therealong; the second rail-rod assembly being identical to the aforementioned first rail-rod assembly, whereby the second assembly can be removed from its position on the cargo box floor and stowed atop the first rail-rod assembly; each curved rod having a circular cross section for engagement with cargo-retention hooks or straps adapted to take different angular positions relative to the cargo box floor in accordance with the dimensions of the cargo.

2. The improvement of claim 1 wherein each curved rod has its ends extending into a semi-circular notch formed in an edge of the associated flange on the rail, each weld joint extending around the rod periphery at the notch surface.

3. The improvement of claim 1 wherein the rail is dimensioned so that each of its flanges is approximately two inches wide; each curved rod having an internal radius of curvature of about three fourth inch.

4. The improvement of claim 1 wherein the first rail is reinforced against pullout from the floor by means of back-up plates positioned on the underside of the floor; each back-up plate being centered beneath one of the curved rods; the rail being secured to the floor by means of bolts extending through the rail horizontal flange and the back-up plates; the bolts being arranged in pairs, the bolts in each pair being located a fixed distance on either side of the plane of a curved rod.

5. The improvement of claim 1, wherein the rail-rod assemblies are held together in the stowed position by means of tie bolts extending through aligned holes in the rails.

* * * * *